United States Patent
Carlson et al.

(10) Patent No.: US 9,299,385 B2
(45) Date of Patent: Mar. 29, 2016

(54) EFFICIENT ELIMINATION OF ACCESS TO DATA ON A WRITABLE STORAGE MEDIA

(75) Inventors: Wayne Charles Carlson, Tucson, AZ (US); Cheryl Marie Friauf, Tucson, AZ (US); Gregory Tad Kishi, Oro Valley, AZ (US); Duke Andy Lee, Tucson, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1574 days.

(21) Appl. No.: 11/840,907

(22) Filed: Aug. 17, 2007

(65) Prior Publication Data

US 2009/0049310 A1 Feb. 19, 2009

(51) Int. Cl.
H04L 29/06 (2006.01)
G06F 21/00 (2013.01)
G11B 20/00 (2006.01)

(52) U.S. Cl.
CPC .... *G11B 20/00086* (2013.01); *G11B 20/00666* (2013.01); *G11B 2220/90* (2013.01)

(58) Field of Classification Search
CPC ................. G11B 20/00086; G11B 20/00275; G11B 20/00876; G11B 20/0021; G11B 20/00333; H04L 9/083; H04L 9/0894; H04L 63/061; H04L 63/0428; G06F 3/0686; G06F 3/0623; G06F 3/0653; G06F 21/81
See application file for complete search history.

(56) References Cited

U.S. PATENT DOCUMENTS

| | | | | |
|---|---|---|---|---|
| 5,265,159 A | * | 11/1993 | Kung | 713/193 |
| 5,748,744 A | * | 5/1998 | Levy et al. | 380/52 |
| 6,754,827 B1 | * | 6/2004 | Cane et al. | 713/193 |
| 6,871,278 B1 | * | 3/2005 | Sciupac | 713/185 |
| 6,912,634 B2 | * | 6/2005 | Ripley et al. | 711/164 |
| 6,941,459 B1 | * | 9/2005 | Hind et al. | 713/167 |
| 6,983,351 B2 | | 1/2006 | Gibble et al. | 711/159 |
| 6,993,661 B1 | | 1/2006 | Garfinkel | 713/193 |
| 7,363,326 B2 | * | 4/2008 | Margolus | 707/663 |
| 7,730,541 B2 | * | 6/2010 | Kawaguchi et al. | 726/26 |
| 2002/0108051 A1 | * | 8/2002 | Fougeroux et al. | 713/193 |
| 2003/0028715 A1 | * | 2/2003 | Maple et al. | 711/111 |
| 2003/0196036 A1 | | 10/2003 | Gibble et al. | 711/111 |
| 2005/0182951 A1 | * | 8/2005 | Sohn | 713/189 |
| 2005/0223414 A1 | * | 10/2005 | Kenrich et al. | 726/27 |
| 2006/0130156 A1 | * | 6/2006 | Ng et al. | 726/33 |
| 2006/0143443 A1 | | 6/2006 | Cohen et al. | 713/158 |
| 2006/0155944 A1 | * | 7/2006 | Kano | 711/161 |
| 2006/0210085 A1 | | 9/2006 | Ho et al. | 380/279 |
| 2006/0224902 A1 | | 10/2006 | Bolt | 713/193 |

(Continued)

OTHER PUBLICATIONS

U.S. Appl. No. 11/840,911, Wayne Charles Carlson, et al., 'Efficient Elimination of Access to Data on a Writable Storage Media', pp. 1-45 (includes 4 pgs of figs), TUC9-2007-0117-US2 (Application filed Aug. 17, 2007).

(Continued)

*Primary Examiner* — Lisa Lewis
(74) *Attorney, Agent, or Firm* — Zilka-Kotab, PC

(57) ABSTRACT

A method and computer program product are provided for eliminating access to data within a writable storage media cartridge. If it is determined if at least a first portion of data on the writable storage media is encrypted then a second portion of data within the writable storage media cartridge related to said encrypted first portion of data is shredded. The first portion of data and the second portion are not the same portions of the writable storage media cartridge.

37 Claims, 10 Drawing Sheets

(56) References Cited

U.S. PATENT DOCUMENTS

| | | | |
|---|---|---|---|
| 2007/0180272 A1* | 8/2007 | Trezise et al. | 713/193 |
| 2007/0260592 A1* | 11/2007 | Anglin et al. | 707/4 |
| 2008/0034224 A1* | 2/2008 | Ferren et al. | 713/193 |
| 2008/0063206 A1 | 3/2008 | Karp et al. | |
| 2009/0049311 A1 | 2/2009 | Carlson et al. | |
| 2009/0052664 A1 | 2/2009 | Goodman et al. | |

OTHER PUBLICATIONS

U.S. Appl. No. 11/841,473, Brian Gerard Goodman, et al., 'Bulk Data Erase Utilizing An Encryption Technique', pp. 1-32 (includes 5 pgs of figs), TUC9-2006-0209-US1 (Application filed Aug. 20, 2007).

U.S. Appl. No. 11/841,490, Brian Gerard Goodman, et al., 'Bulk Data Erase Utilizing An Encryption Technique', pp. 1-35 (includes 5 pgs of figs), TUC9-2006-0209-US2 (Application filed Aug. 20, 2007).

U.S. Appl. No. 11/470,807, James M. Karp, et al., 'Method for Altering the Access Characteristics of Encrypted Data', pp. 1-28 (includes 6 pgs of figs), TUC9-2006-0128-US1 (Application filed Sep. 7, 2006).

Non-Final Office Action Summary from U.S. Appl. No. 11/840,911 dated Jul. 20, 2011.

Final Office Action Summary from U.S. Appl. No. 11/840,911 dated Dec. 9, 2011.

Final Office Action from U.S. Appl. No. 11/840,911, dated Feb. 1, 2011.

Office Action from U.S. Appl. No. 11/840,911, dated Aug. 18, 2010.

Office Action from U.S. Appl. No. 11/840,911, dated May 18, 2015.

Examiner's Answer from U.S. Appl. No. 11/840,911 dated Jul. 19, 2012.

PCT International Search Report and Written Opinion (Date of Mailing: Jan. 27, 2009) for Application No. PCT/EP2008/060242 filed Aug. 4, 2008.

Orvis, William J.: 'Clearing, Sanitizing, and Destroying Disks CIAC-2325' [Online] Mar. 30, 2005; XP002508772; URL: http://ftp3.gwdg.de/pub/misc/cert.dfn/csir/ciac/ciacdocs/ciac2325.doc> [retrieved on Dec, 19, 2008] p. 1-112.

Non-Final Office Action from U.S. Appl. No. 11/840,911, dated Aug. 28, 2015.

Patent Board Decision on Appeal from U.S. Appl. No. 11/840,911, dated Mar. 3, 2015.

Final Office Action from U.S. Appl. No. 11/840,911, dated Dec. 16, 2015.

* cited by examiner

EFFICIENT ELIMINATION OF ACCESS TO DATA ON A WRITABLE STORAGE MEDIA

TECHNICAL FIELD

The disclosure relates generally to automated data storage systems and more particularly, to a method and a computer program product for determining and performing an efficient elimination of access to data stored on tape media of a tape cartridge.

BACKGROUND OF THE INVENTION

A virtual tape system is a tape management system such as a special storage device or group of devices and software which manages data such that the data appears to be stored entirely on tape cartridges when portions of the data may actually be located in faster, hard disk storage. Programming for a virtual tape system is sometimes referred to as virtual tape server (VTS), although these terms may be used interchangeably, unless otherwise specifically indicated. A virtual tape system may be used with hierarchical storage management (HSM) system in which data is moved as the data falls through various usage thresholds to slower but less costly forms of storage media. A virtual tape system may also be used as part of a storage area network (SAN) where less-frequently used or archived data can be managed by a single virtual tape server for a number of networked computers.

In prior art virtual tape storage systems, such as International Business Machines (IBM) Magstar Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a tape volume cache (TVC) of the VTS subsystem. When using a VTS, the host application writes tape data to virtual drives. The volumes written by the host system are physically stored in the tape volume cache (e.g., a RAID disk buffer) and are called virtual volumes. The storage management software within the VTS copies the virtual volumes in the TVC to the physical cartridges owned by the VTS subsystem. Once a virtual volume is copied or migrated from the TVC to tape, the virtual volume is then called a logical volume. As virtual volumes are copied from the TVC to a Magstar cartridge (tape), they are copied on the cartridge end to end, taking up only the space written by the host application. This arrangement maximizes utilization of a cartridge storage capacity.

The storage management software manages the location of the logical volumes on the physical cartridges, and the customer has no control over the location of the data. When a logical volume is copied from a physical cartridge to the TVC, the process is called recall and the volume becomes a virtual volume again. The host cannot distinguish between physical and virtual volumes, or physical and virtual drives. Thus, the host treats the virtual volumes and virtual drives as actual cartridges and drives and all host interaction with tape data in a VTS subsystem is through virtual volumes and virtual tape drives.

One issue of VTS systems is the management of data within the tapes. The VTS system may have a number of duplicate, invalid, latent or unused copies of data. After a virtual tape volume is created and/or modified (one or more records are written to the volume) and closed, the virtual tape volume is copied onto the physical tape (logical) volume. The image of the virtual volume copied to a physical volume when the virtual volume was closed is a complete version of the virtual volume at the point in time the virtual volume was closed. If a virtual volume is subsequently opened and modified, when the virtual volume is closed, that image of the virtual volume is also copied onto physical tape, however the virtual volume does not overwrite the prior version of the volume since the virtual volume may have a different size than the previous version. So at any point in time, there may be several versions of the same volume serial number that reside on one or more physical tape volumes.

Moreover, physical volumes within a VTS are arranged in groups that are called "pools," with each physical volume including one or more logical volumes. Each of the physical volumes managed by the VTS system is assigned to one of 32 pools, for example. It is understood that each pool of physical volumes is assigned a name and may have one or more parameters associated therewith. For example, typical parameters associated with a pool include, but are not limited to: a media type (e.g. physical volumes having 10 Gigabyte tape or 20 Gigabyte tape); and a rule(s) for managing volumes in a pool. One rule may involve the concept of "reclamation" whereby the VTS monitors what percentage of data associated in a particular physical volume is still valid. That is, over time, data space occupied by a logical volume needs to be reclaimed from a physical volume when the data is no longer used or needed by the host, e.g., the physical volume has expired. Thus, if any volume(s) in the pool falls below a reclaim percent threshold, then a reclamation process will be performed to take the valid logical volume(s) off the physical volume and put the valid logical volume on another physical volume—potentially combining multiple partially full physical volumes and filling up the other.

If a virtual volume is removed from the physical volume and put on to another physical volume, the data on the first physical volume is deleted but has not been overwritten, and thus, the data may be accessed and recovered. Further, data associated with the most current version of a virtual volume may be expired or considered latent or unusable by the customer, but the virtual volume still will exist on the physical tape volume and could be accessed.

Recently, enterprises have become more dependent on the ability to store, organize, manage and distribute data. Accordingly, "information life-cycle management," the process of managing business data from conception until disposal in a manner that optimizes storage, access, and cost characteristics has become increasingly important. In particular, the significance of how data is "deleted" or disposed of has increased as confidential data has begun to play a more vital role in business transactions and stricter regulations are imposed on maintaining customer privacy.

To protect confidential or sensitive data (e.g., credit card information, social security number) and to maintain customer privacy it is advantageous to eliminate access to certain data by performing a long erase so that the data is unrecoverable and inaccessible. Eliminating access to data is defined herein rendering data permanently unreadable by any reasonable means. The method of performing a long erase from the beginning of tape to the end of tape has worked sufficiently for all media types regardless of media capacity and drive capabilities. However, as newer media types and drive capabilities have been developed this method has become less efficient and less effective. The present disclosure provides a method, system and computer program product for determining and performing an efficient process of eliminating access to data on a tape cartridge.

SUMMARY OF THE INVENTION

A method and computer program product are provided for eliminating access to data within a writable storage media cartridge. If it is determined if at least a first portion of data on the writable storage media is encrypted then a second portion of data within the writable storage media cartridge related to said encrypted first portion of data is shredded. The first portion of data and the second portion are not the same portions of the writable storage media cartridge.

In one embodiment, in response to determining that at least another portion of the writable storage media cartridge is not encrypted it may then be determined if a long erase has been performed on the writable storage media of the writable storage media cartridge. If a previous long erase has not been completed on the writable storage media a long erase may be performed on the at least another portion of the writable storage media of the writable storage cartridge. In one embodiment a database is updated in response to performing the long erase. In one embodiment the long erase may be performed before shredding of the second portion of data. In an alternative embodiment the long erase may be performed after the shredding of the second portion of data. The shredding of the second portion may be accomplished by overwriting the second portion one or more times utilizing a data pattern that contains one of logical ones, zeros, or some combination thereof.

In one embodiment shredding the second portion comprises shredding at least one encryption key. The writable storage media cartridge is a tape cartridge in one embodiment, and the tape cartridge may include tape media and a cartridge memory. The second portion of data may be stored on the tape media in a non-user portion of the tape media. In addition, or alternatively, the second portion of data may be stored in the cartridge memory the tape cartridge.

DETAILED DESCRIPTION OF THE PREFERRED EMBODIMENTS

Figure 1:
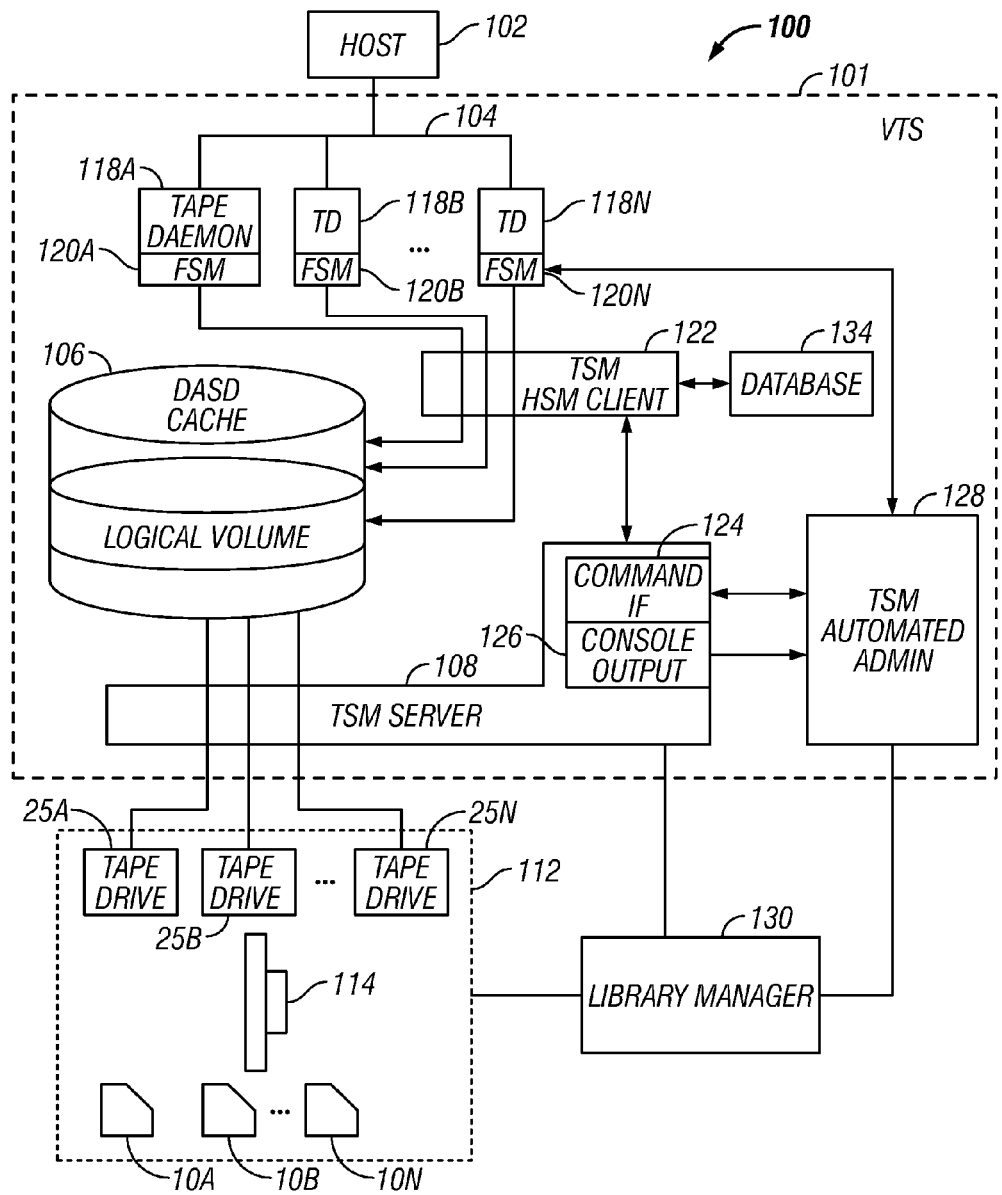
FIG. 1 illustrates a detailed block diagram of a tape network including a tape subsystem according to an embodiment of the present disclosure.

The following is intended to provide a detailed description of an example of the invention and should not be taken to be limiting of the invention itself. Rather, any number of variations may fall within the scope of the invention which is defined in the claims following the description. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block or blocks of the block diagram. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. The storage medium may be any writable storage media such as a tape cartridge, optical disk, disk drive, USB storage device, a flash memory, holographic memory, non-volatile magnetic memory such as magnetoresistive random access memory (MRAM), and the like. For example, the storage device may be a tape drive, optical drive, disk drive controller, USB drive controller, a flash drive, or other storage device that is capable of reading and/or writing a writable storage media as described above. For simplicity, the description provided herein is provided with respect to a tape drive and a tape cartridge as the respective storage device and storage medium. One of ordinary skill in the art will recognize that these concepts apply to other storage devices and storage media. The terms "data storage drive" "storage drive", "drive", "tape storage drive", and "tape drive" are herein used interchangeably herein. Further, it is noted that the terms "removable media cartridge", "data storage cartridge", "storage cartridge", "tape cartridge" and "cartridge" are herein used interchangeably herein. Various illustrative embodiments of the present invention will now be described in detail below with reference to the figures.

While the tape management system is referred to herein as a Virtual Tape System (VTS), a VTS is only one example of a tape management system. As would be understood by one of ordinary skill in the art the present disclosure applies to any tape management system, such as a tape library and virtual tape software etc. Further, it should be noted that while only one virtual storage system 100 is shown in FIG. 1, more than one virtual storage system (e.g. a dual cluster) may be provided in the present disclosure. The virtual storage systems 100, while not shown, may be connected such that information stored in one virtual storage system may be accessible by other virtual storage systems.

With reference now to FIG. 1, there is depicted a block diagram of an exemplary virtual storage system 100 that provides a suitable environment for the practice of the present disclosure. Virtual storage system 100 includes a virtual tape server 101, a tape library 112, and a library manager 130. A host system 102 is linked to the virtual tape server 101 via a network connection, e.g. TCP/IP, LAN, Ethernet, and the IBM Enterprise System Connection (ESCON) (not shown). In one embodiment, host system 102 is a computer, such as a personal computer, workstation or mainframe that is linked to the virtual tape server 101 via an ESCON channel. Virtual tape server 101, in one embodiment, is a computer including a processor, such as a personal computer, workstation or mainframe and is associated with a Direct Access Storage Device (DASD) cache 106. The DASD cache 106 preferably includes one or more logical volumes. In one embodiment, DASD cache 106 includes a plurality of hard disks that are spaced into redundant array of inexpensive disk (RAID) arrays.

Tape library 112 includes a plurality of tape drives 25, generally designated tape drives 25A, 25B . . . 25N, such as International Business Machine (IBM), TS1100 or Jaguar 3592 tape drives or any other tape drive known in the art. Generally, a removable storage volume, e.g., a tape cartridge 10A, 10B, . . . 10N, is loaded into each of the tape drives. Tape drives 25 are serviced by an accessor (e.g., a robot) 114 which transfers selected tape cartridges 10A, 10B, . . . 10N between tape drives 25 and their corresponding positions within a tape cartridge repository.

It will be noted that the variable identifier "N" is used in several instances in FIG. 1 to more simply designate the final element (e.g., tape drives, 25A, 25B . . . 25N, and tape cartridges, 10A, 10B, . . . 10N) of a series of related or similar elements (e.g., tape drives and tape cartridges). The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

Tape library 112 typically includes storage management software utilized to monitor the active space on the tape cartridges and schedule reclamations of tape cartridges when the system is less active. In one embodiment, tape library 112 is a tape library system such as the IBM Virtualization Engine TS 7740 and IBM Magstar 3494 Tape Library. Library manager 130 is utilized in virtual storage system 100 to install, maintain, configure, and operate tape library 112. Within automated library 112, accessor 114 may be controlled utilizing a library manager 130 based upon inputs received from storage management server 108 and/or an automated storage management administrator 128.

DASD cache 106 that includes, in one embodiment, a tape volume cache, provides a cache for data stored in tape library 112. DASD cache 106 maintains logical volumes as logical volume files that are concatenated into physical volume files in the tape cartridges loaded in the tape drives located within tape library 112. When a logical volume file in DASD cache 106 moves to a tape drive in a tape library 112, the logical volume file is written to a physical volume file on a tape cartridge in the actual tape drive. When a physical volume file is recalled for a tape drive and moved to DASD cache 106, the physical volume file then becomes a logical volume file in the DASD cache 106. In this way, DASD cache 106 provides a window to host system 102 of all the physical volume files in tape library 112.

Virtual tape data storage system includes a plurality of virtual tape daemons, generally designated as tape daemons 118A, 118B . . . 118N, that represent and emulate virtual tape devices to host system 102. Host system's 102 operating system, in turn, manages the presentation of the virtual tape devices to the systems users (not shown). Host system 102 views the virtual tape devices as actual drives and when host system 102 attempts to access a logical volume in a selected virtual tape device, the respective virtual tape daemon associated with the virtual tape device requested by the host system 102 will handle the host access request.

Host-to-DASD cache data transfer in the illustrated virtual tape data storage subsystem may be controlled by VTS code via a process such as a hierarchical storage manager (HSM) client 122. For example, a HSM client 122 within virtual storage system 100 intercepts and processes the access request from the virtual tape daemons 118A, 118B, . . . 118N. HSM client 122 then carries out host system's 102 request to access the logical volume file on DASD cache 106. In one embodiment, host-to-DASD cache data transfer is directly controlled by a file system manager (FSM) 120A, 120B, . . . 120N which handles DASD read and write commands.

Similarly, an interface between the DASD cache 106 and the tape storage drive 25 may be controlled by storage management server 108. For example, if HSM client 122 attempts to mount a logical volume file that is not located in DASD cache 106, HSM client 122 will communicate the access request to the storage manager server 108. If the tape in the access request is already mounted in a tape drive in tape library 112, storage manager server 108 will access the physical volume for the requested logical volume file from the mounted tape. However, if the requested file on a tape is not presently mounted in a tape drive, the storage manage server 108 will initiate a request to library manager 130 to mount the tape containing the physical volume corresponding to the requested logical volume file.

Examples of a storage management processing module which could be used as storage management server 108 and HSM client 122 are the Tivoli Storage Manager (TSM) application and IBM ADSTAR Distributed Storage Manager (ASDM) product, both of which are provided by International Business Machines Corporation of Armonk, N.Y. In virtual storage system 100, storage management server 108 includes a command interface 124 and a console output 126.

In a one embodiment, storage manager server 108 migrates entire logical volume files from DASD cache 106 to tape library 112. When the available space in DASD cache 106 reaches a predetermined level or after a predetermined time period, an automated storage management administrator 128 will direct storage manager server 108 to migrate logical volume files from DASD cache 106 to tape library 112 for archival therein.

Further, storage management server 108 may diagnose errors or determine the origin of errors that are detected (e.g. the tape drive 25 or tape cartridge). Based on the determination of the error origin the storage management server 108 may take appropriate action to create an error recovery procedure (ERP).

As explained above, since expired data on a physical volume may remain accessible and readable until the volume has undergone a long erase in which the data on the volume has been completely overwritten one or more times utilizing a predetermined file or data pattern (e.g., logical ones, zeroes, some combination thereof). According to one embodiment, automated storage management administrator 128 provides functionality needed perform the long erase process of the present disclosure, and additionally performs many VTS specific administrative functions utilizing storage management server 108. For example, automated storage management administrator 128 may include a long erase processing module. The long erase process renders data on the tape cartridge permanently unreadable and inaccessible by any reasonable means by overwriting all data of the physical volume one or more times utilizing a predetermined file or data pattern (e.g., logical ones, zeroes, some combination thereof). Techniques for the long erase process may be user or host-selectable (e.g., based upon a desired level of security) or automatically determined. The overwriting may be performed by one of the tape drives 25A, 25B . . . 25N.

In one embodiment the HSM 122 may be connected to a database 134 that contains physical device records with information associated with the physical volumes (physical tape cartridge(s) 10A, 10B, . . . 10N). The data may be stored in a volume status table (not shown). For example, the physical volume records may contain information such as the data format, whether the data is encrypted or non-encrypted and the location of the encrypted and/or non-encrypted data on the tape cartridge 10. In addition, the physical volume records of database 134 may include information regarding whether or not a previous long erase has been performed on the tape cartridge 10 and the time the most recent long erase was performed. In addition the database 134 may contain physical device records which may contain information regarding the devices within the virtual storage system 100. For example the physical device records of database 134 may record the encryption capability of each drive 25.

While not shown in FIG. 1, the automated storage management administrator 128 or the tape drive(s) 25 may contain a database 134, such that automated storage management administrator 128 and/or tape drive(s) 25 stores information as described above, including, but not limited to: data format, whether data is encrypted or non-encrypted, the location of encrypted and/or non-encrypted data, if a long erase has been performed on the physical tape cartridge 10, the time the most recent long erase was performed, and the encryption capability of the tape drive 25.

In the foregoing described embodiment, as well as subsequent embodiments, wherein the different components are contained within different other components, it is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

A long erase, as described above, would be performed by overwriting data on the tape media one or more times utilizing a predetermined file or data pattern (e.g., logical ones, zeroes, some combination thereof). The amount of time required for performing the long erase is proportionate to the capacity of the tape media. For current tape cartridges having 700 gigabytes of capacity the long erase process can take up to 2 hours. While the tape drive is performing the long erase it is not available to perform other processes such as read and/or write processes, therefore reducing the efficiency of the overall system. As tape media capacities increases, and as newer media types and drive capabilities are developed, the current long erase process will become less efficient and less effective.

IBM® has developed a method and a system for encrypting data on removable media such as tape media. Encryption may be described as the transformation of data into a form, called a cipher text, using one or more encryption keys that cannot be easily transformed back to the original data without the one or more decryption keys. Decryption may be described as the process of transforming the encrypted data back into its original form using one or more decryption keys. Utilizing encryption capabilities within the virtual storage system 100 as described in FIG. 1 or other cartridge handling system provides an efficient process for eliminating access to data on a tape cartridge.

Figure 2:
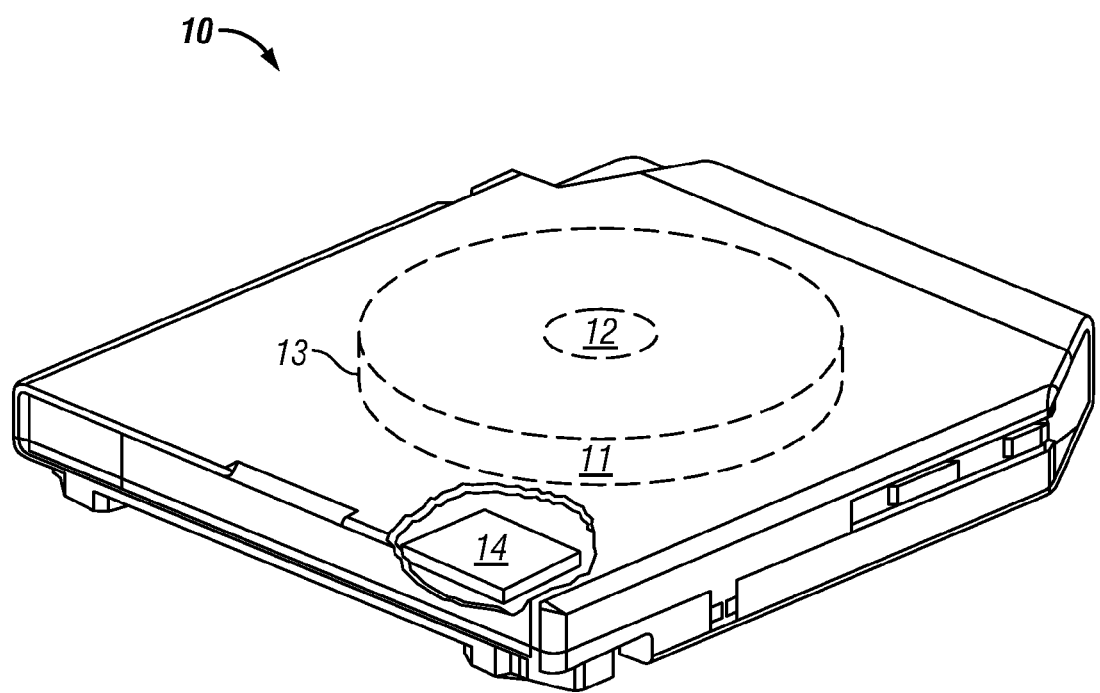
FIG. 2 illustrates a tape storage cartridge with a cartridge memory and a tape medium.

Referring to FIG. 2, a tape cartridge 10 is illustrated which may include a cartridge memory (CM) 14 (shown in cutaway) and tape media 11, such as a high capacity single reel of magnetic tape (shown in phantom) wound on a hub 12 of a reel 13. If present, the cartridge memory 14 may comprise electrical contacts to allow the library 112 and/or tape drive 25 to access the contents of the cartridge memory 14. Alternatively, the cartridge memory 14 may comprise a contactless interface such as induction, radio frequency, or optical. In one embodiment, the cartridge memory 14 comprises an RFID tag. The cartridge memory 14 is used to hold information about the tape cartridge 10, the tape media 11 in the tape cartridge 10, and/or the data on the media. The cartridge memory 14 may also be used to store information about the tape drive 25 that accesses the tape cartridge 10 and/or other devices or applications that may be coupled to the tape drive, such as a library, host computer, operating system, device driver, storage application software, etc. The memory may be read only, write only, read/write, or combinations thereof. For example, portions of the cartridge memory 14 may be read only while other portions are capable of being written or updated. Examples of magnetic tape cartridges are a cartridge based on LTO (Linear Tape Open) technology, such as the IBM TotalStorage LTO Ultrium Data Cartridge, and a cartridge based on IBM's 3592 technology, such as the IBM 3592 Enterprise Tape Cartridge. As will be appreciated, the tape cartridge 10 may be a magnetic tape cartridge having a dual reel implementation (in which the tape is fed between reels within the cartridge) or single reel implementation, such as illustrated in FIG. 2, in which the tape media 11 is wound on a reel 13 within tape cartridge 10. For example, when the tape cartridge 10 is loaded into a tape drive (e.g. tape drive 25), the tape media is fed between the cartridge reel and a take up reel (not shown) located in the tape drive 25. While exemplary tape cartridges based on the LTO and 3592 formats have been provided, it will be appreciated that the description is not limited by tape format. Examples of other tape formats include DLT, SDLT, 9840, 9940, T10000, AIT, and the like. While this invention is being described as using magnetic tape cartridges, it should be noted that other removable media data cartridges may be used. For example, the tape media may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, Compactflash™, Smartmedia™, Memory Stick™, etc.), or other suitable media.

Figure 3:
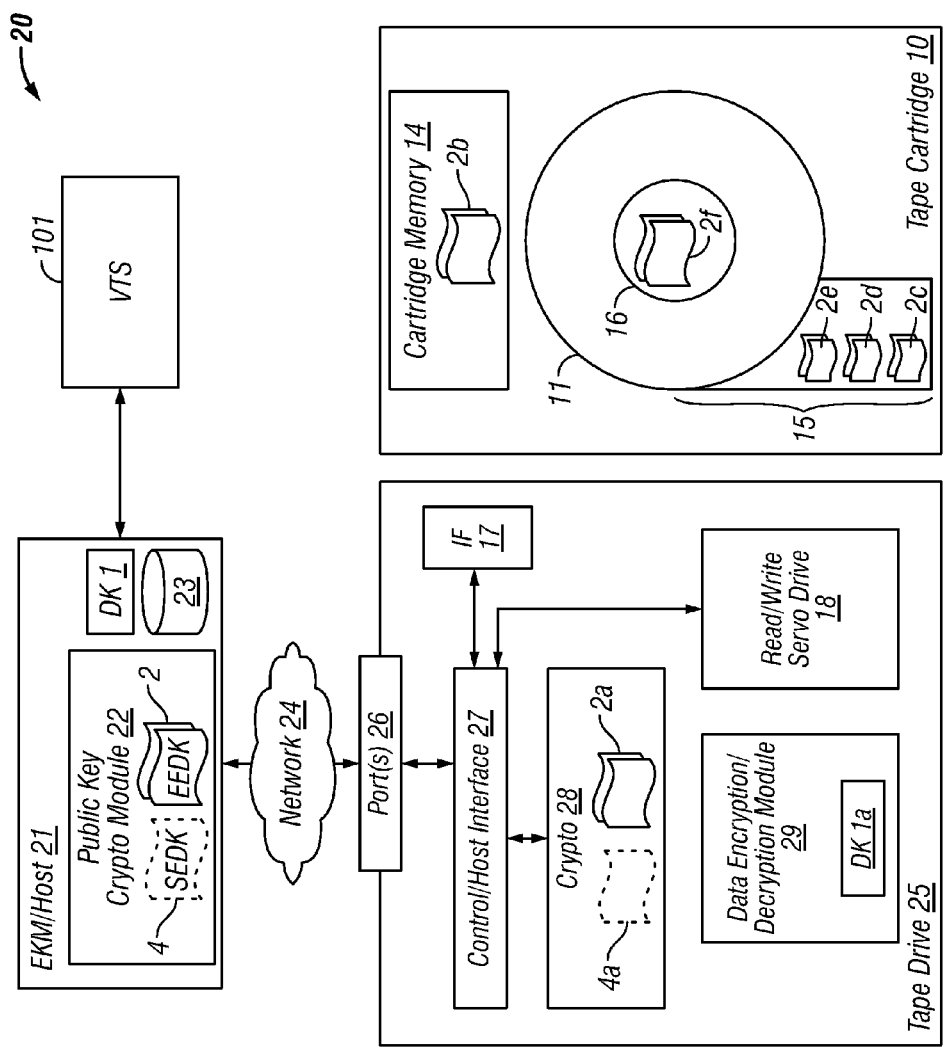
FIG. 3 is a generalized block diagram of a computing environment in which a tape cartridge and tape drive are implemented.

Referring to FIG. 3, a computing environment is illustrated in which a tape cartridge 10, a tape drive 25, and a virtual tape server (VTS) 101 are implemented in combination with an external key manager (EKM) 21 as a cartridge handling system 20. It will be appreciated that the external key manager may be a host computer, another computer or controller, a key management application, or the like. The EKM 21 may also be integrated into a library controller (not shown) or a device driver (not shown), or coupled to a host (not shown). The EKM 21 may comprise hardware, such as FPGAs (Field Programmable Gate Arrays), ASICs (Application Specific Integrated Circuits), discrete logic or circuits, processors, controllers, etc. In addition, the EKM 21 may comprise software, such as modules, functions, routines, code, instructions, etc.

One example implementation of such a cartridge handling system 20 would be a magnetic tape data storage system formed from the combination of an IBM 3592 Model E05 Encrypting Tape Drive and the IBM 3592 Enterprise Tape Cartridge subsystem.

In the illustrated example, the EKM/host system 21 may include a host application (not shown), such as a backup and/or archive application, that transfers data to the tape drive 25 to write to the tape cartridge 10, such as by using Small Computer System Interface (SCSI) commands to communicate I/O requests to the tape drive 25, or any other data access command protocol whether proprietary or known in the art. In addition, the EKM/host 21 may include data key generator functionality for generating a data key 1 for use in encrypting portions of the application data. Data key 1 may also be referred to herein as an "encryption key" or simply as a "key". Alternatively, the data key 1 may be generated by another apparatus or software. The EKM/host 21 may also include a public key crypto module 22 that is used to generate a session encrypted data key (SEDK) 4 from the data key 1, and then to securely pass the SEDK 4 to the tape drive 25 as part of a secure key exchange.

The tape drive 25 may connect with the host 21 through a direct interface (such as an SCSI, Fibre Channel, etc., in the case if the tape drive 25 is connected to the host 21) or may connect over a network 24 (such as a Local Area Network (LAN), Storage Area Network (SAN), Wide Area Network (WAN), the Internet, an Intranet, etc.). It will be appreciated that the tape drive 25 may be enclosed within the host system 21, library system (not shown), virtual tape system (101), some other storage system (not shown), etc. In addition, the tape drive 25 may be a standalone unit as shown in FIG. 3. As illustrated, the tape drive 25 may include a memory circuit interface 17 for reading information from, and writing information to, the cartridge memory 14 of the tape cartridge 10. In addition, a read/write servo drive system 18 is provided for reading information from, and/or writing information to, the tape media 11. The read/write servo drive system 18 controls the movement of a servo head (not shown) relative to the tape media 11 by moving the tape media 11 across at a desired velocity, and stops, starts and reverses the direction of movement of the tape media 11.

A controller 27 in the tape drive 25 communicates with the memory interface 17 and the read/write system servo drive 18. To receive commands and exchange information for operating the cartridge handling system 20, the controller 27 also acts as a host interface to communicate over one or more ports 26 with one or more external key management (EKM) subsystems 21 (such as a host computer, library, external key management appliance, etc.). In addition, a crypto module 28 and data encryption/decryption module 29 are provided in the tape drive 25 for securely encrypting and storing data to the tape cartridge 10 and for securely retrieving and decrypting data stored on the tape cartridge 10.

The data encryption/decryption module 29 performs the actual data encryption and decryption (such as by using the Advanced Encryption Standard encryption algorithm) using a data key having any desired key length (e.g., 128 or 256-bit data key length), and may also perform other encoding functions, such as data compression and decompression and data buffering. The crypto module 28 controls the data encryption/decryption module 29 by obtaining the keys necessary for the desired encryption. For example, in the case of encrypting application encrypted data, crypto module 28 may control the data encryption/decryption module 29 by securely exchanging the session encrypted data key (SEDK) 4a with the EKM 21. The data key 1a is extracted from the SEDK 4a at the crypto module 28 and is sent to the data encryption/decryption module 29 where the data key 1a is used to encrypt/decrypt the input data stream of application data. The crypto module 28 may also assemble, validate, distribute, store and retrieve one or more associated encryption encapsulated data keys (EEDKs) 2a as described in more detail below. The letter suffix "a" in the reference numeral "1a" indicates that the DKs 1 and 1a, are logically identical, though physically distinct copies. Similarly, the letter suffix "a" in the reference numerals "2a" and "4a" indicates that the EEDKs 2 and 2a, and the SEDKs 4 and 4a, respectively, are logically identical, though physically distinct copies.

While the modules 28, 29 may be implemented with any desired combination of hardware and/or software, the data encryption/decryption module 29 may be implemented with an ASIC or FPGA circuit, while the crypto module 28 may be implemented with one or more drive firmware modules that include a microprocessor and firmware stored in a program memory.

As described herein, the cartridge handling system 20 may perform a variety of functions, including but not limited to, encrypting data to be stored on the tape cartridge 10 using the appropriate data key (such as an AES encryption key); using public key cryptography techniques to wrap a data key with a different key to form one or more encrypted data keys; writing and reading encrypted data and encrypted data key(s) to and from the cartridge memory 14 and/or tape media 11; and decrypting the stored encrypted data with the data key that is obtained by unwrapping the encrypted data key. The cartridge handling system 20 may provide a distributed key store which permits different users to access the encrypted data on a single tape cartridge 10 by generating separate EEDKs using each user's public key to wrap the data key 1. For example, at least a first EEDK 2 may be generated for local use by using a public key of the local key manager to wrap the data key 1, and the EEDK 2 is then transferred via the tape drive 25 (where it may be temporarily stored as 2a) for storage on the tape cartridge 10 at one or more predetermined locations, as indicated at 2b, 2c, 2d, 2e and 2f. As a result, the transferred EEDK 2 may be stored in the cartridge memory 14 and/or one or more non-user data areas of the tape media 11, such as a read-in area 15 or an end of tape area 16. Though a single copy of the EEDK 2 may be stored on the tape cartridge 10, security and reliability are enhanced by using one or more non-user areas 15, 16 of the tape media 11 to store multiple (e.g., three or more) copies of the EEDK 2, thereby allowing deletion of the EEDKs 2, 2a at the EKM 21 and tape drive 25. Since the only non-volatile copies of the EEDKs are stored within the tape cartridge 10, multiple copies of the EEDKs (2b, 2c, etc)

provides multiple ways to access the EEDKs and thus the data key 1 in the cases where one or more copies of the EEDKs cannot be read or otherwise processed due to errors or degraded media or tape drive conditions.

When a plurality of EEDKs 2 are generated from a single data key 1—such as when a second EEDK is generated for a remote user (e.g., a business partner) by using a public key of the remote user to wrap the data key 1—the plurality of EEDKs 2 are transferred via the tape drive 25 for storage on the tape cartridge 10 at one or more locations (as indicated by the copies of the EEDKs 2b-f that are stored in one or more non-user data areas 15, 16 of the tape media 11 and/or the cartridge memory 14). By storing multiple EEDKs on the tape cartridge 10 in specially designated locations (such as the cartridge memory 14 or outside of the tape media's user data area), the tape cartridge 10 can have one EEDK wrapped for local use and another for remote exchange. In theory, any number of different EEDKs could be stored, provided there is storage space for them.

Figure 4:
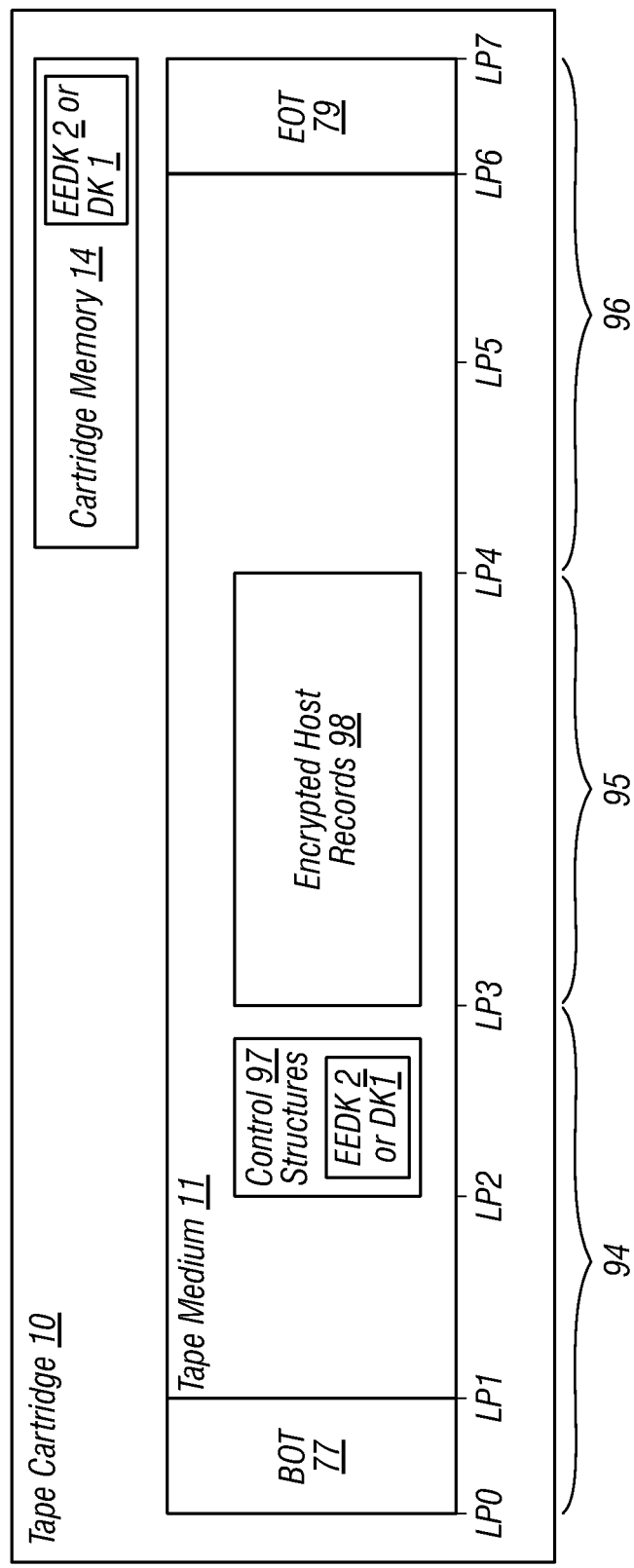
FIG. 4 is a generalized block diagram illustration of the medium format elements of the magnetic tape medium in a tape cartridge.

An example implementation of how EEDKs 2 are stored is illustrated in FIG. 4, which depicts a tape cartridge 10 having a cartridge memory 14 and a tape medium 11 and which shows the tape medium format elements of the tape medium 11. With reference to an illustrative implementation in which the tape medium 11 uses an LTO tape format, the length of a tape medium 11 is divided into logical points (LPs), which define bounds of regions of the tape medium. The regions of LP0 to LP1 and LP6 to LP7 are unused as they define the beginning of tape (BOT) region 77 and the end of tape (EOT) region 79, respectively. Additional non-user regions include the region of LP1 to LP2 (which is a servo acquisition area), the region of LP2 to LP3 (which is a calibration area that includes different information in the different bands), and the regions after LP4 (which include the servo acquisition region for reverse wraps). Thus, the tape medium 11 layout includes non-user areas 94 and 96. The tape medium 11 layout also includes user data regions 95 (between LP3 and LP4) in which data 98, such as encrypted host records is stored. In addition data 98 may comprise non-encrypted data, or a combination of encrypted and non-encrypted data. Of course, different tape formats may be used other than LTO formats.

As illustrated in FIG. 4, the EEDKs 2 may be stored in multiple places by using the non-user parts of tape cartridge 10 to store the EEDKs. For example, an EEDK 2 may be stored in the cartridge memory 14. In addition or alternatively, EEDKs 2 may be stored in special non-user data set regions 94, 96 of the tape medium 11 that are designed for holding this type of information, such as the tape regions before the User Data area (i.e. before LP3) or after it (i.e. after LP4). Thus, for each encrypted tape cartridge 10 stored in the tape medium 11, an internal control storage area 97 is provided which allows the storage of EEDK structures 2 if this structure is provided by the external key manager.

When the EEDKs 2 are stored in non-user areas, the data key wrapping technology described herein may be used to change the access to the encrypted data by changing the access to the encrypted data key without re-encrypting the underlying data, thereby providing a variety of additional cartridge control features, such as adding an EEDK 2 to the removable media cartridge, re-keying a removable media cartridge, shredding a encryption key such that data on the tape cartridge is inaccessible, and setting a removable media cartridge to persistently non-encrypted state.

Figure 5A:
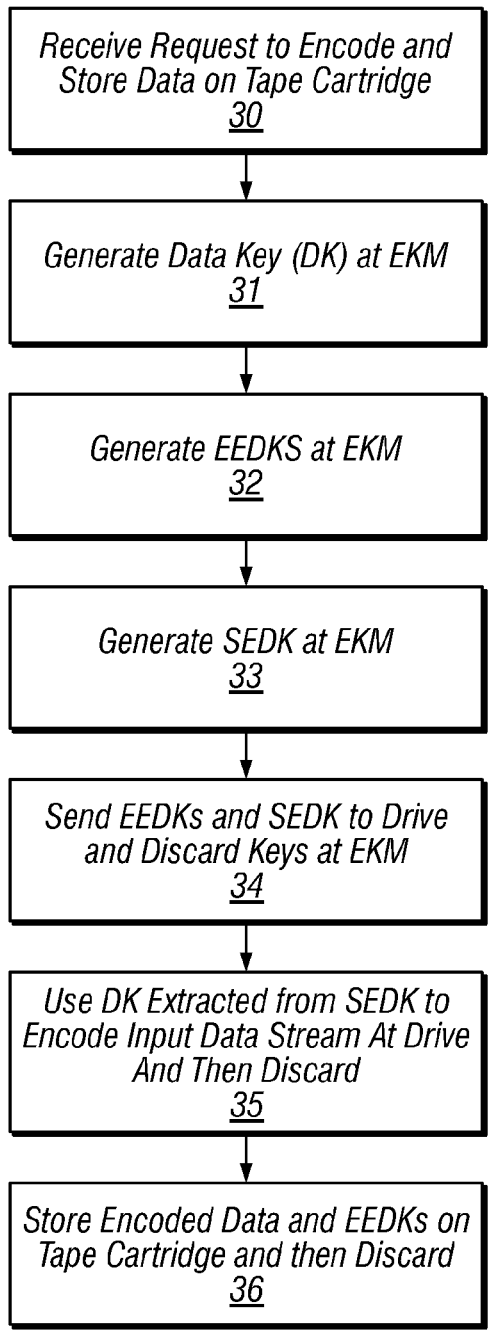
FIG. 5A is a logical flowchart of the steps used to encode and store data.

To illustrate how data may be securely encoded and stored on a removable tape cartridge that has not previously acquired its own encrypted data keys, reference is now made to the process flow depicted in FIG. 5A and the cartridge handling system 20 depicted in FIG. 3. When a request is received to encode and store data on the tape cartridge 10 (step 30), a DK 1 is generated at the EKM 21 (step 31) and is then made available in encrypted form to the tape drive 25 before the write process begins. To this end, a secure key exchange is used to transfer the DK 1 in encrypted form to the tape drive 25 for purposes of enabling the tape drive encryption process.

While a variety of different encryption techniques may be used, an initial key generation process at the EKM 21 encrypts the DK 1 to form one or more EEDKs using an encryption method, such as a pubic key cryptographic method (step 32). It is unimportant whether the encryption method is known outside of the EKM. In a selected embodiment, the EEDK creation process in the EKM 21 uses asymmetric encryption by performing RSA 2048-bit encryption of the DK 1 with the public part of a public/private key pair to render the data key 1 within the EEDK 2 completely secure to any entity who does not possess the private part of the key pair. To associate the generated EEDK(s) 2 with the public/private key pair used to encrypt the DK 1, structural information about the public/private key pair is included in each generated EEDK by the EKM 21 which can be extracted from the EEDK for future access to the data key and consequently the encrypted data itself.

At this time, a secure key exchange is established to encrypt the data key DK 1 with a session key (e.g., the public key from the tape drive 25), thereby generating a session encrypted data key 4 (SEDK) (step 33) which can be securely passed, along with the EEDK(s) 2, to the tape drive 25. Once the EKM 21 sends the encrypted data keys to the tape drive 25, the data key 1 and encrypted data key(s) 2, 4 may be discarded by the EKM 21 (step 34). As will be appreciated, there are several methodologies which may be used for secure key exchanges, including wrapping the data key 1 in a session key, though other techniques may be used, including but not limited to RSA, Diffie-Hellman (DH), elliptic curve Diffie Hellman (ECDH), Digital Signature Algorithm (DSA), elliptic curve DSA (ECDSA), etc. The session key may come from the tape drive 25 or the host 21.

Upon transfer to the tape drive 25, the EEDK(s) 2a and the SEDK 4a are stored in the crypto module 28. The tape drive 25 decrypts the SEDK 4a with its private session key to produce the data key 1A which is used to set up the encryption hardware module 29. At any point after the encryption hardware module 29 is set up, the SEDK 4a may be discarded from the tape drive (step 35). The tape drive 25 also writes the EEDK(s) 2a to the tape cartridge 10 as part of set up or any point thereafter, and begins encrypting data using the extracted data key 1A. When writing the EEDKs 2a to the tape cartridge 10, the tape drive 25 stores multiple copies of the EEDK 2b-2f in a plurality of locations, such as one or more non-user data areas 15, 16 of tape media 11 and in the cartridge memory 14 (step 36). In selected embodiments, the EEDKs are written to the tape cartridge 10 before the encoding or writing of data since such writing may comprise many gigabytes. Also, by recording the EEDKs first, the host system that encounters an error condition can retrieve some portion of the written encoded data by using the previously stored EEDK for that encoded data. While the EEDKs 2a could be discarded from the tape drive 25 after being written to the tape cartridge 10, they may be retained in the tape drive 25 in a volatile fashion for as long as the tape cartridge 10 is loaded in the tape drive 25. Once the input data stream is encrypted and the tape drive 25 has written the encoded data to the tape media 11, the tape drive 25 discards the data key 1A (step 36). Once the encoded data and EEDK(s) 2b-2f are stored to the tape cartridge 10, the tape drive 25 discards the encoded data and the EEDK(s) 2a (step 36).

Figure 5B:
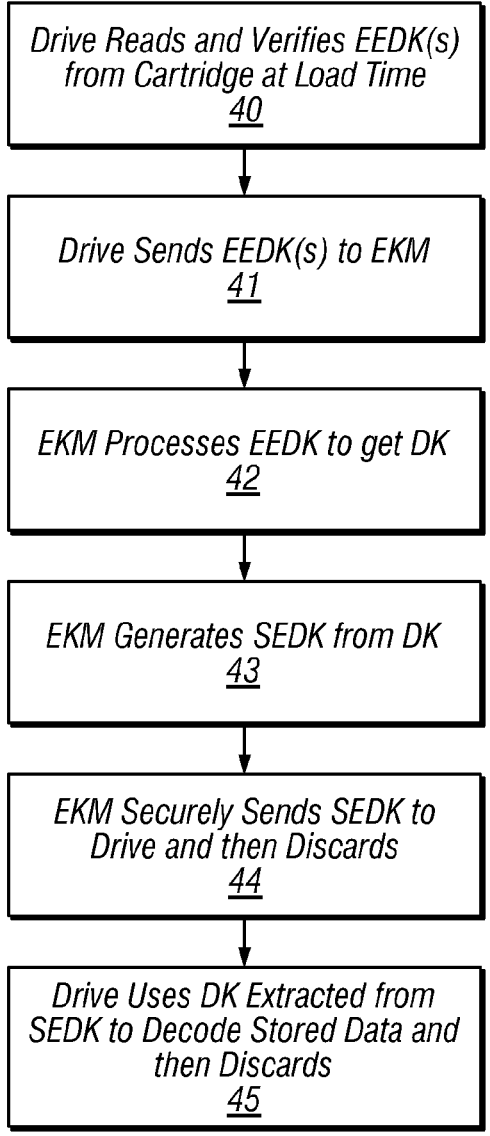
FIG. 5B is a logical flowchart of the steps used to read and decode stored data.

An example of how data may be securely decoded and read from a removable tape cartridge will now be described with reference to the process flow depicted in FIG. 5B and the cartridge handling system 20 depicted in FIG. 3. During the tape cartridge load process, the tape drive 25 recognizes that a tape media 11 has encryption data on it by detecting the existence of EEDKs or other control indicators on the tape cartridge 10 (step 40). This may be done at the tape drive 25 by reading the EEDK(s) 2b from cartridge memory 14 and/or by reading and verifying the EEDK(s) 2c-f from a non-user data area(s) 15, 16 of tape media 11.

To enable the tape device hardware decryption and/or encryption process(es), a key exchange must occur in order to retrieve and decrypt the stored EEDKs 2b-f for purposes of extracting the correct decryption data key. However, when the data keys are not retained or stored on the tape drive 25 or the EKM 21, the EEDKs 2b-f must be used to reacquire the data key 1 at the EKM 21 which is then securely transferred to the tape drive 25. For example, after the tape cartridge 10 is loaded and the EEDKs 2b-f are stored as EEDKs 2a in the crypto module 28 of the tape drive 25, the tape drive 25 sends the EEDKs 2a to the EKM 21 (step 41), either in response to a request from the EKM 21 (or automatically in the case of a library/appliance model). Once the EEDKs 2 are transferred to the EKM 21, the EKM 21 determines their validity and decrypts the EEDKs 2 by extracting structural information from each EEDK and searching the key store 23 for a match, in which case the associated private key is output from the key store 23 and used to decrypt the EEDK, thereby extracting the data key DK 1 (step 42). The data key DK 1 is then securely wrapped in the driver's session key to generate the session encrypted data key SEDK 4 (step 43). Using any desired secure key exchange protocol, the EKM 21 passes the SEDK 4 to the tape drive 25 where it is stored as the SEDK 4a, at which time the EKM 21 discards the SEDK 4 (step 44). The tape drive 25 then decrypts the SEDK 4a with its private session key to produce the data key 1A which is used to setup the decryption hardware module 29 (step 45). Again, the tape drive 25 can discard the SEDK 4a at any point after the decryption hardware module 29 is setup, even before the stored data is decrypted.

The following method, which may be implemented as computer readable code, utilizes information about the physical media (e.g. tape cartridge 10) and the tape drive 25 in the virtual tape system 101 to determine the most efficient and effective method to ensure access to an expired data on a physical volume (e.g. tape cartridge 10) is eliminated.

Figure 6A:
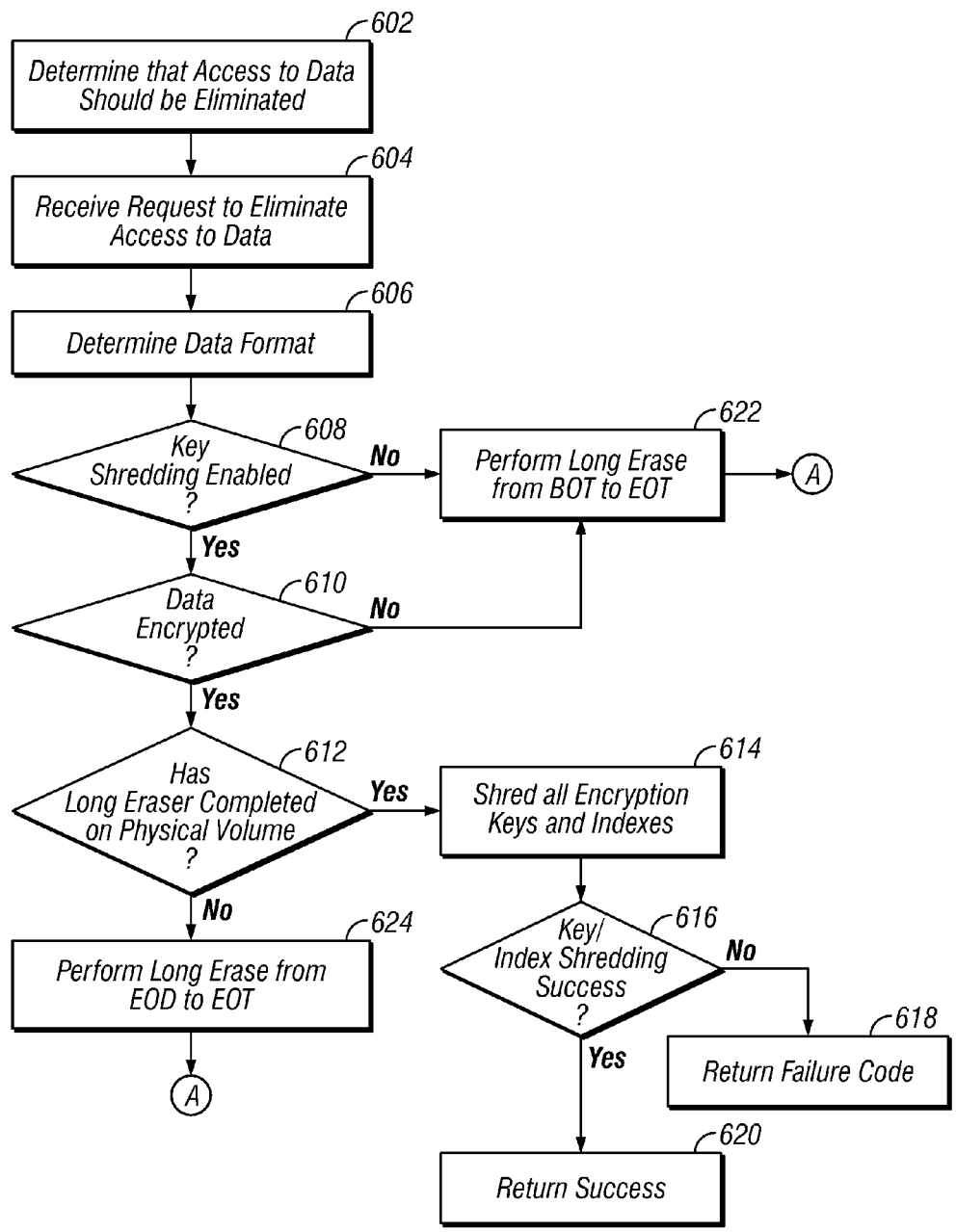
FIGS. 6A and 6B is a logical flowchart of the steps used to efficiently eliminate access to data stored on tape media of a tape cartridge.

An example of how access to data stored on tape media 11 of tape cartridge 10 will not be described with reference to the process flow depicted in FIG. 6A and FIG. 6B and the cartridge handling system 20 depicted in FIG. 3. As shown in FIG. 6A, the process begins at step 602. In step 602 the HSM 122 determines that access to data stored on tape media 11 of tape cartridge 10 should be eliminated. The HSM 122 may determine that access to data stored on tape media 11 of tape cartridge 10 should be eliminated based on, for example, the physical volume expiring, or an explicit request from a customer.

In step 604, the storage management server 108 receives a request from the HSM 122 to eliminate access to the data stored on tape media 11 of tape cartridge 10. In response, the storage management server 108, causes the tape cartridge 10 to be mounted within the tape drive 25. In step 606, the storage management server 108 determines the format that the data has been written in. As one of ordinary skill in the art would understand tape cartridges may be written in different formats, (e.g. J1A, EO5 Native Mode, EO5 Encrypted format) wherein each format affects the capacity of the tape media 11 of tape cartridge 10. If the data format is E05 Encrypted format then the tape cartridge 10 may be encrypted.

In step 608, the storage management server 108 determines whether the user has enabled the tape library 112 to perform encryption key shredding as a means to eliminate access to data stored on tape media 11 of tape cartridge 10. Since encrypted data can only be accessible by an authorized user who has access to the encryption keys to decrypt the data, by shredding or removing the encryption keys to the encrypted tape cartridge 10 access to the encrypted data on the tape cartridge is eliminated. Shredding is defined herein as destroying or otherwise rendering data (e.g. data stored on the user areas of the tape media and encryption keys stored on the tape cartridge) permanently unreadable by any reasonable means.

Some users may prefer the virtual storage system to perform a long erase, and therefore, the user may not enable encryption key shredding as the method of eliminating access to data.

If the storage management server 108 determines that encryption key shredding is enabled by the user in step 608 the process flows to step 610. In step 610, the tape drive 25 determines if the data stored on tape media 11 of tape cartridge 10 is encrypted.

In step 610, if the tape drive 25 determines that the data is encrypted the process flows to step 612. In step 612 the storage management server 108 determines if a long erase has been performed before on the physical volume (e.g. tape cartridge 10). The storage management server 108 is coupled to database 134 which contains the physical device record that stores information such as whether a long erase has been performed previously and a timestamp of the last successful long erase.

If the storage management server 108 determines in step 612 that a long erase has not been completed on a physical volume (e.g. tape cartridge 10) previously then the process flows to step 624. In step 624, the tape drive 25 performs a long erase on the data of tape media 11 corresponding to the portion after the end of encrypted data, identified as end of data (EOD, 78), to the end of the tape media 11 (EOT, 79). It should be understood by one of ordinary skill in the art that the long erase may be performed on the data in any order. For example the data may be long erased beginning with the data immediately after EOD 78 and ending with the EOT 79. Further, the long erase may begin at EOT 79 and end at the EOD 78. Finally, the long erase may be performed beginning with any portion between the EOD 78 and EOT 79, just so long as all of the data between EOD 78 and EOT 79 is long erased.

Figure 6B:
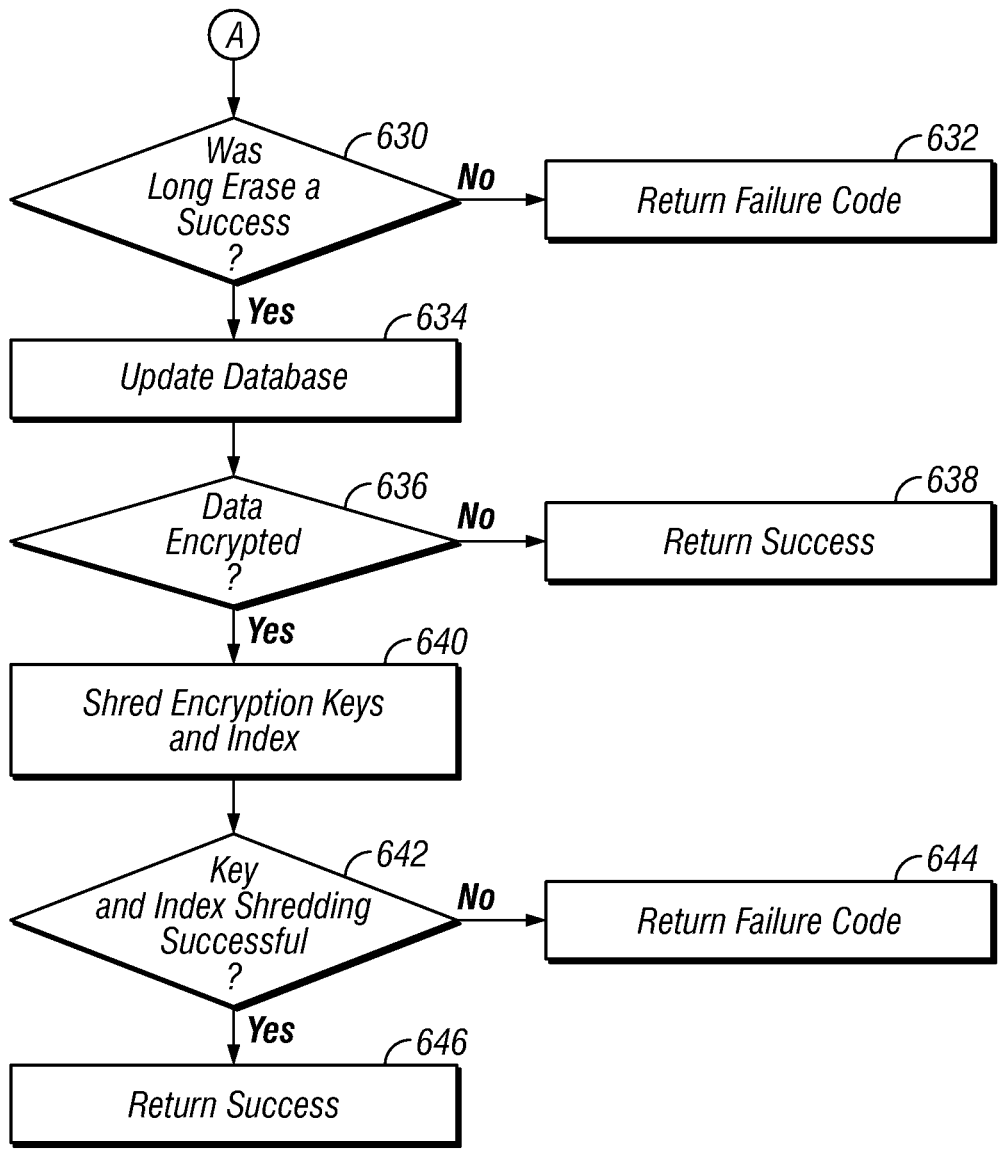

In step 630, as seen in FIG. 6B, the storage management server 108 determines if long erase performed in step 622 completed successfully. If the storage management server 108 determines that the long erase did not complete successfully or if an error was detected the process flows to step 632. In step 632, a failure is returned to the HSM 122, indicating that the long erase did not complete successfully.

If the storage management server 108, in step 630 determines that the long erase was completed successfully then the process flows to step 634. In step 634 the storage management server 108 updates the physical device records (not shown) stored in the database 134. In step 636, the tape drive 25 determines if the data on the tape cartridge 10 is encrypted. Alternatively, step 636 may be omitted since the tape drive 25 has already been determined that the data is encrypted in step 610. Therefore, the process flows to step 640. In step 640, the tape drive 25 shreds the encryption keys and the indexes that remain on the tape media 11 of tape cartridge 10.

The storage management server 108 determines if the encryption key shredding process completed successfully in step 642. If the storage management server 108 determines that the encryption key shredding process was not successful, the storage management server 108, in step 644, returns a failure code to the HSM 122 indicating that the encryption key shredding process was not successful. Alternatively, if it is determined that the encryption key shredding process was successful the storage management server 108 returns a success message in step 646, indicating that the encryption key shredding process was completed successfully.

Figure 7:
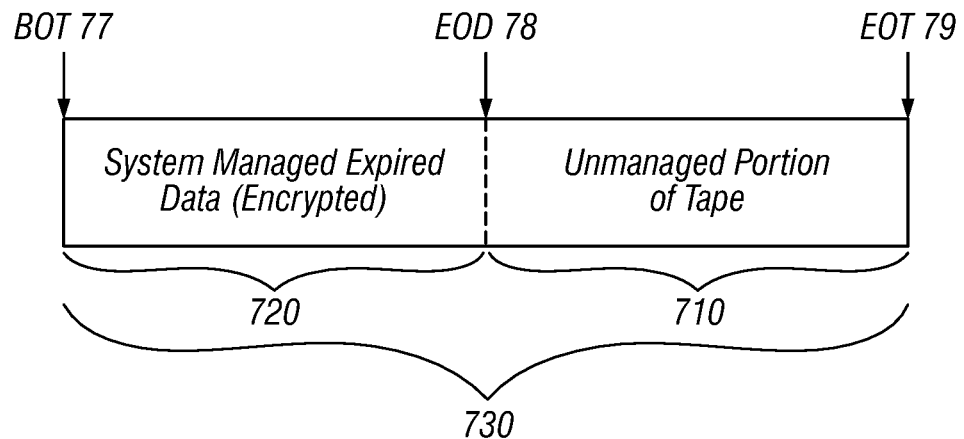
FIG. 7 is a generalized block diagram illustration of an example of data stored on magnetic tape medium in a tape cartridge.

The above embodiment is an example in which the encryption key shredding capability is enabled and the data stored on tape media 11 of tape cartridge 10 is encrypted. FIG. 7 illustrates an example in which at least a portion of a tape media 11 contains expired encrypted data (720) and a portion of unmanaged data (710). It should be understood by one or ordinary skill in the art that the unmanaged data may comprise non-encrypted data as well as unmanaged encrypted data. Unmanaged encrypted data may comprise data or portions of data that had been previously encrypted, but the encryption keys may have been shredding upon re-writing new data to the tape cartridge. The tape drive 25 may automatically overwrite the storage location of old keys when new data is encrypted with new encryption keys. In addition, the tape drive 25 may automatically shred the keys from all key storage locations on the cartridge when the data format is changed. In one example, if a data format is changed from encrypted to non-encrypted the tape drive 25 may automatically shred the keys from all key storage locations on the cartridge.

In the above described process of FIGS. 6A and 6B the tape drive 25 performs a long erase (step 624) on the portion of data (710) after the encrypted data ends 78 (end of data, EOD) to the end of the tape 79 (EOT) of tape cartridge 10. Once the long erase is performed on portion 710 the unmanaged data comprising non-encrypted data is inaccessible. Further, in step 640 of FIG. 6A and FIG. 6B the encryption keys and indexes are removed. Once the encryption keys and indexes are shredded, the portion of the data 720 that contains expired encrypted data is inaccessible. Therefore, by the tape drive 25 performing both the long erase from the end of data 78 to the end of the tape 79 (step 624) and the shredding of encryption keys and indexes in step (640) the entire tape (portion 730) of tape cartridge 10 is inaccessible.

The amount to time required for eliminating access to the data stored on tape media 11 will be greatly reduced since the amount of data that is long erased is greatly reduced. Instead, the process of FIGS. 6A and 6B shreds the encryption key and indexes, which may contain approximately only 1 kilobyte of information and performs a long erase only on the portion of data that is unmanaged.

Returning to step 608 of FIG. 6A, if it is determined in step 608 that the user has not enabled encryption key shredding the process flows to step 622. In step 622 the tape drive 25 performs a long erase from the beginning of tape 77 (BOT) to the end of tape 79 (EOT). In step 630, as seen in FIG. 6B, the storage management server 108 determines if long erase performed in step 622 completed successfully. If the storage management server 108 determines that the long erase did not complete successfully or if an error was detected the process flows to step 632. In step 632, a failure is returned to the HSM 122, indicating that the long erase did not complete successfully.

If the storage management server 108 in step 630 determines that the long erase was completed successfully then the process flows to step 634. In step 634 the storage management server 108 updates the physical device records (not shown) stored in the database 134. In step 636, the tape drive 25 determines if the data on the tape cartridge 10 is encrypted. If the tape drive 25 determines that the data was not encrypted the process flows to step 638. In step 638 the storage management server 108 returns a success to the HSM 122.

Figure 8:
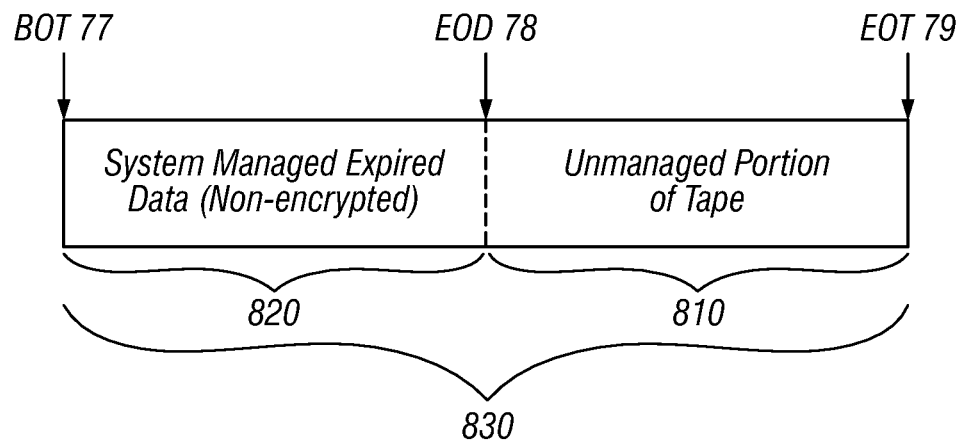
FIG. 8 is a generalized block diagram illustration of another example of data stored on magnetic tape medium in a tape cartridge.

The above embodiment is an example in which the encryption key shredding capability is disabled and the data is non-encrypted. An example in which at least a portion of a tape contains expired non-encrypted data (820) and a portion of unmanaged data (810) is shown in FIG. 8. Once the tape drive performs the long erase process (step 622) the data stored on tape media 11 of tape cartridge 10 (represented by 830) is inaccessible.

In an alternative embodiment, even if the tape drive 25 determines that the data was non-encrypted, the encryption keys and indexes may remain on the tape cartridge 10 from previous usage of the tape cartridge 10. It is important to note that the indexes that may remain on the tape include references or pointers to block information on the tape cartridge 10 indicating where user data is stored and information regarding the location of other copies of the data keys 1. However, in some embodiments, such as when implemented with an IBM 3592 Model E05 drive, encryption keys and indexes may not remain since the system the tape drive 25 may automatically shred the encryption keys and indexes when the data format is changed. On the other hand, in the case where the encryption keys and indexes may remain, the tape drive 25 may perform an encryption key and index shred as additional safeguard to ensures that all means of accessing data is eliminated. If the user desired the encryption keys and indexes to be shredded on a cartridge that does not contain encrypted data then the user may set the system such that the process flow diagram continues to step 640.

Figure 11:
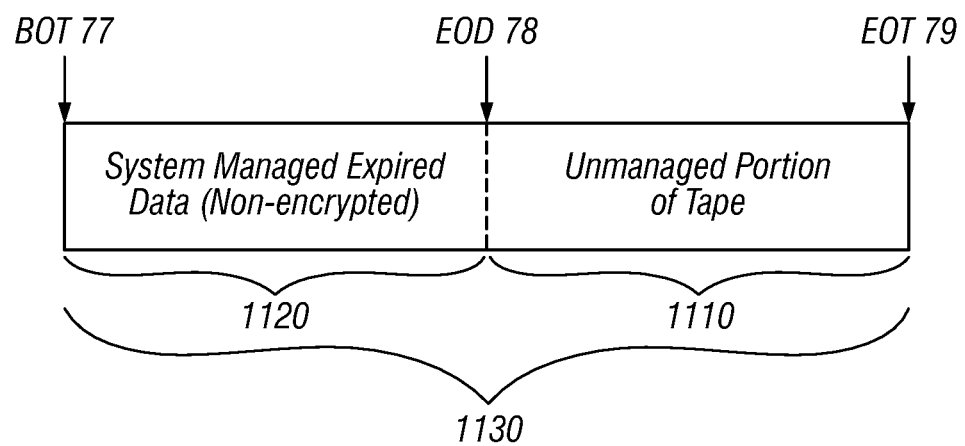
FIG. 11 is a generalized block diagram illustration of an additional example of data stored on magnetic tape medium in a tape cartridge.

FIG. 11 illustrates an example in which the tape cartridge 10 contains a portion of expired non-encrypted data (1120) and an unmanaged portion of tape (1110). Once a long erase process (step 622) is performed on the data stored on tape media 11 of tape cartridge 10 the portion of the data represented by 1130 is rendered inaccessible. When the encryption keys and indexes are shredded (in step 640) any remaining encryption keys or indexes that contain information regarding portion 1130 is removed and portion 1130 is again rendered inaccessible.

Similarly, in one embodiment, it may be advantageous to shred the encryption keys and the indexes that remain on the tape media 11 of tape cartridge 10 even if the user has not enabled the encryption key shredding process as the means to eliminate access to data stored on the data storage cartridge. Returning to FIG. 6B, if in step 636 the tape drive 25 determines that the data on the tape cartridge is encrypted, the process flows to step 640. In step 640, the tape drive 25 shreds the encryption keys and the indexes that remain on the tape media 11 of tape cartridge 10.

The storage management server 108 determines if the encryption key shredding process completed successfully in step 642. If the storage management server 108 determines that the encryption key shredding process was not successful, the storage management server 108, in step 644, returns a failure code to the HSM 122 indicating that the encryption key shredding process was not successful. Alternatively, if it is determined that the encryption key shredding process was successful the storage management server 108 returns a success message in step 646, indicating that the encryption key shredding process was completed successfully.

Figure 9:
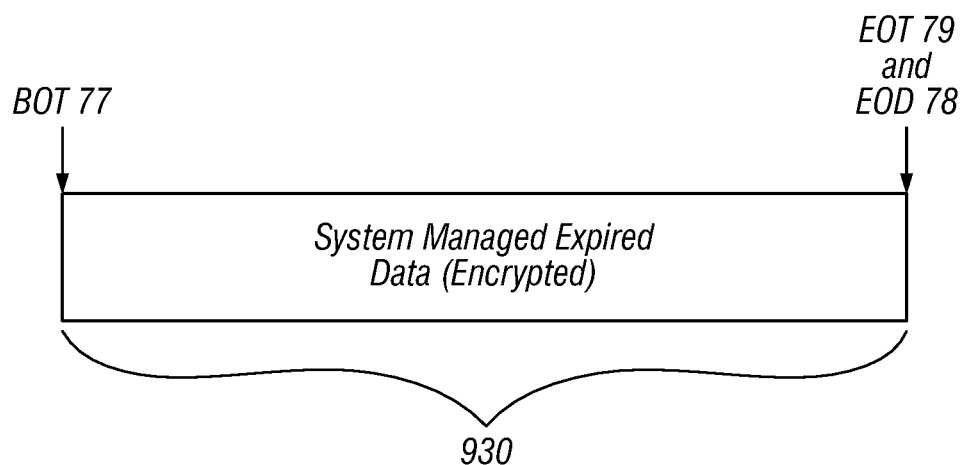
FIG. 9 is a generalized block diagram illustration of an additional example of data stored on magnetic tape medium in a tape cartridge.

The above embodiment is an example in which the encryption key shredding capability is disabled by the user and the data is encrypted. An example in which a tape cartridge contains expired encrypted data (portion 930) is shown in FIG. 9. In the above described process of FIGS. 6A and 6B a long erase is performed (step 622) on the portion of data (930) from the beginning of tape 77 (BOT) to the end of the tape 79 (EOT) of tape cartridge 10. Once a long process is performed on the data of the tape cartridge 10 all of the data (represented by 930) is inaccessible. However, since at least a portion of the data is encrypted the encryption keys and indexes may still remain on the tape cartridge 10. While the encryption keys and indexes cannot be used unless they are non-encrypted, in one embodiment, the encryption keys and indexes are also shredded to ensure elimination of access to data (represented by 930), including the elimination of access to any pointers to where data may have existed.

Returning, to step 610 in FIG. 6A, if the tape drive 25 determines that the data on tape media 11 of tape cartridge 10 is not encrypted then the process flows to step 622. In step 622, the tape drive 25 performs a long erase from the beginning of tape 77 (BOT) to the end of tape 79 (EOT). In step 630, as seen in FIG. 6B, the storage management server 108 determines if long erase performed in step 622 completed successfully. If the storage management server 108 determines that the long erase did not complete successfully or if an error was detected the process flows to step 632. In step 632, a failure is returned to the HSM 122, indicating that the long erase did not complete successfully.

If the storage management server 108 in step 630 determines that the long erase was completed successfully then the process flows to step 634. In step 634 the storage management server 108 updates the physical device records (not shown) stored in the database 134. In step 636, the tape drive 25 determines if the data on the tape cartridge 10 is encrypted. Alternatively, step 636 may be omitted since the tape drive 25 has already been determined that the data is not encrypted in step 610. Therefore, the process flows to step 638 in which the storage management server 108 returns a success to the HSM 122.

The above described process flow describes an example in which the encryption key shredding capability is enabled, however the data is non-encrypted. Once a long erase process is performed on the data stored on tape media 11 of tape cartridge 10 in this example, all of the data on the entire tape is inaccessible (represented by 830 in FIG. 8).

Again, in an alternative embodiment, even if the tape drive 25 determines that the data was not encrypted the encryption keys and indexes may remain on the tape cartridge 10 from previous usage of the tape cartridge 10. As explained above, by performing an encryption key shred an additional safeguard is provided that ensures that all means of accessing data is eliminated. If the user desires the encryption keys and indexes to be shredded on a cartridge that does not contain encrypted data then the user may set the system such that the process flow diagram continues to step 640.

FIG. 11 illustrates an example in which the tape cartridge 10 contains a portion of expired non-encrypted data and a portion of unmanaged portion of tape. Once a long erase process (step 622) is performed on the data stored on tape media 11 of tape cartridge 10 the portion of the data represented by 1130 is rendered inaccessible. When the encryption keys and indexes are shredded (in step 640) any remaining encryption keys or indexes that contain information regarding portion 1130 is removed and portion 1130 is again rendered inaccessible.

Returning to step 610 of FIG. 6A, if the tape drive 25 determines if the data on the tape cartridge 10 is encrypted the process flows to step 612. In step 612, if the storage management server 108 determines that a long erase has been performed on the physical volume (e.g. tape cartridge 10) the process continues to step 614. In step 614 the encryption keys and the indexes are shredded. The encryption keys and the indexes may be shredded by the tape drive 25 by overwriting the portion of cartridge memory 14 and/or tape media 11 that contain the encryption keys and indexes.

In step 616 the storage management server 108 determines if the encryption key and index shredding was completed successfully. If the storage management server 108 determines that the encryption key shredding was not completed successfully then the process flows to step 618 in which the storage management server 108 returns a failure code to the HSM 122 indicating that the encryption key shredding process did not complete successfully. On the other hand if the storage management server 108 determines in step 616 that the encryption key shredding was a success then the process continues to step 620 and the storage management server 108 returns a success to the HSM 122 indicating that the encryption key shredding process completed successfully.

Figure 10:
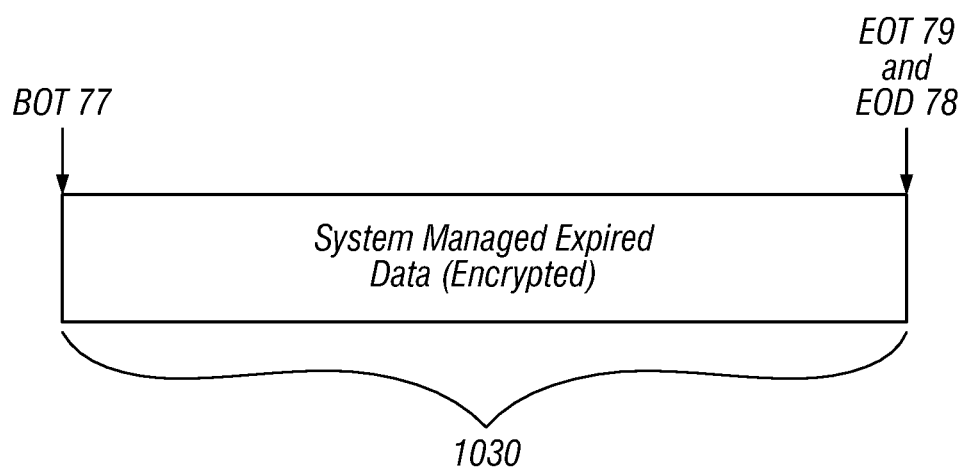
FIG. 10 is a generalized block diagram illustration of yet another an example of data stored on magnetic tape medium in a tape cartridge.

The above embodiment is an example in which the encryption key shredding capability is enabled, the data is encrypted, and a long erase has already been completed in the past on the particular physical volume (e.g. tape cartridge 10). An example in which a portion of the tape cartridge 10 (portion 1030) is encrypted and a long erase has already been completed is illustrated in FIG. 10. In the above described process of FIGS. 6A and 6B, a long erase has already been completed as determined in step 612 and the encryption keys and indexes are shredded (step 614). Once the encryption keys and indexes have been shredded from tape cartridge 10 the data (as represented by portion 1030) on the tape media 11 of tape cartridge 10 is inaccessible.

The amount to time required to access to the data stored on tape media 11 is greatly reduced since the amount of data that is overwritten is greatly reduced. In the present example, since a long erase has already been completed on the tape media 11 of tape cartridge 10, by shredding the encryption keys and indexes, the data on tape media is rendered inaccessible. This process can be completed in a manner of seconds rather than hours since shredding the encryption keys and indexes may require overwriting approximately only 1 kilobyte of information, while a long erase would require overwriting nearly 700 terabytes of information.

Although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of the processes described herein may be performed in any order practical. Further, some steps may be performed simultaneously, in parallel, or concurrently. For example, while the step of tape drive 25 performing the long erase (step 622 or step 624) is depicted as being performed before the step of shredding the encryption keys and index (step 640), it should be understood by one of ordinary skill in the art that the step of shredding may be performed before the long erase.

Further, it should be understood that the long erase may be performed on the data in any order. For example, the long erase may be performed from the end of data 78 (EOD) to the end of tape 79 (EOT), or from the EOT 79 to the EOD 78, or in any order on the tape media.

Additionally, it should be understood that some steps may be omitted. For example, as discussed above step 636 may be omitted if the tape drive 25 has already been determined in step 610 if the data of tape media 11 is encrypted.

Each of the blocks of the flow diagrams of FIGS. 6A and 6B, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention. As will also be apparent to those of skill in the art, methods for determining delay and jitter described herein may employ other techniques (similar in effect to those described herein) to make such determinations, and such alternative techniques are intended to be comprehended by the methods and apparati discussed herein.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for eliminating access to data within a writable storage media cartridge comprising:
   determining that a first portion of data on said writable storage media cartridge is encrypted;
   determining whether key shredding is enabled;
   in response to determining that key shredding is not enabled, performing a long erase on at least the encrypted first portion of data; and
   shredding an encryption key related to said encrypted first portion of data.

2. The method of claim 1, further comprising determining that at least another portion of said writable storage media cartridge is not encrypted, and, in response, determining if a previous long erase has been completed on writable storage media of said writable storage media cartridge.

3. The method of claim 2, further comprising performing said long erase on said writable storage media of said writable storage media cartridge in response to determining that said previous long erase has not been completed on said writable storage media of said writable storage media cartridge.

4. The method of claim 3, wherein said long erase is performed on said at least another portion of said writable storage media of said writable storage media cartridge.

5. The method of claim 3, further comprising updating a database in response to performing said long erase.

6. The method of claim 3, wherein said long erase is performed before said shredding of said encryption key.

7. The method of claim 3, wherein said long erase is performed after said shredding of said encryption key.

8. The method of claim 1, wherein said encryption key that is shredded is on said writable storage media cartridge.

9. The method of claim 1, wherein said writable storage media cartridge is a tape cartridge, and wherein said tape cartridge comprises tape media and a cartridge memory.

10. The method of claim 9, wherein said tape media comprises a non-user portion and said encryption key is stored on said non-user portion.

11. The method of claim 9, wherein said encryption key is stored on said cartridge memory.

12. The method of claim 1, wherein said shredding comprises overwriting said encryption key one or more times utilizing a data pattern that contains one of logical ones, zeroes, or some combination thereof.

13. A method comprising:
   eliminating access to data on tape media of a tape cartridge, wherein said tape media includes at least one portion of encrypted data, wherein said eliminating access comprises:
     determining whether key shredding is enabled for eliminating access to the data on said tape media;
     in response to determining that key shredding is not enabled, performing a long erase on said at least one portion of encrypted data on said tape cartridge;
     shredding at least one encryption key from said tape cartridge corresponding to said at least one portion of encrypted data; and
     performing a long erase on remaining data on said tape media that does not include said at least one portion of encrypted data.

14. The method of claim 13, wherein said tape cartridge comprises a cartridge memory, wherein said at least one encryption key is stored in said cartridge memory.

15. The method of claim 13, wherein said encryption key is shredded in response to determining that key shredding is not enabled.

16. The method of claim 13, wherein said at least one encryption key is stored on said tape media.

17. The method of claim 13, comprising receiving a command from a user to enable key shredding for a subsequent operation.

18. The method of claim 13, wherein said shredding comprises overwriting said at least one encryption key one or more times utilizing a data pattern that contains one of logical ones, zeroes, or some combination thereof.

19. The method of claim 13, further comprising updating a database in response to performing said long erase.

20. The method of claim 13, wherein said long erase is performed before said shredding said at least one encryption key.

21. The method of claim 13, wherein said long erase is performed after said shredding said at least one encryption key.

22. A computer program product comprising a non-transitory computer useable storage media, said computer useable storage media having program instructions embodied therewith, said program instructions executable by a computer to cause said computer to perform a method comprising:
determining that at least a first portion of data on a writable storage media cartridge is encrypted;
shredding at least one encryption key from said writable storage media cartridge corresponding to said at least one portion of encrypted data;
performing a long erase on remaining data on said writable storage media cartridge that does not include said at least one portion of encrypted data;
determining whether key shredding is enabled; and
in response to determining that key shredding is not enabled, perform the long erase on said first portion of the data,
wherein the encryption key is shredded in response to determining that key shredding is not enabled.

23. The computer program product of claim 22, comprising computer instructions that cause said computer to determine that at least another portion of said writable storage media cartridge is not encrypted, and, in response, determining if a previous long erase has been completed on writable storage media of said writable storage media cartridge.

24. The computer program product of claim 23, comprising computer instructions that cause said computer to perform a long erase on said writable storage media of said writable storage media cartridge in response to determining that said previous long erase had not been completed on said writable storage media of said writable storage media cartridge.

25. The computer program product of claim 24, wherein said long erase is performed on said at least another portion of said writable storage media of said writable storage media cartridge.

26. The computer program product of claim 24, comprising computer instructions that cause said computer to update updating a database in response to performing said long erase.

27. The computer program product of claim 22, wherein said writable storage media cartridge is a tape cartridge, and wherein said tape cartridge comprises tape media and cartridge memory.

28. The computer program product of claim 27, wherein said tape media comprises a non-user portion and said encryption key is stored on said non-user portion.

29. The computer program product of claim 27, wherein said encryption key is stored on said cartridge memory.

30. The computer program product of claim 22, wherein said shredding comprises overwriting said encryption key one or more times utilizing a data pattern that contains one of logical ones, zeroes, or some combination thereof.

31. A computer program product comprising a non-transitory computer useable storage media, said computer useable storage media having program instructions embodied therewith, said program instructions executable by a computer to cause said computer to perform a method comprising:
eliminating access to data on tape media of a tape cartridge, wherein said tape media includes at least one portion of encrypted data, wherein said eliminating access comprises:
shredding at least one encryption key from said tape cartridge corresponding to said at least one portion of encrypted data;
performing a long erase on remaining data on said tape media that does not include said at least one portion of encrypted data;
determining whether key shredding is enabled; and
in response to determining that key shredding is not enabled, perform the long erase on encrypted portions of the data, wherein the encryption key is shredded in response to determining that key shredding is not enabled.

32. The computer program product of claim 31, wherein said tape cartridge comprises a cartridge memory.

33. The computer program product of claim 32, wherein said at least one encryption key is stored in said cartridge memory.

34. The computer program product of claim 31, wherein said at least one encryption key is stored on said tape media.

35. The computer program product of claim 34, wherein said at least one encryption key is stored on a non-user portion of said tape media.

36. The computer program product of claim 31, wherein said shredding comprises overwriting said at least one encryption key one or more times utilizing a data pattern that contains one of logical ones, zeroes, or some combination thereof.

37. The computer program product of claim 31, comprising computer instructions that cause said computer to update a database in response to performing said long erase.

* * * * *